(12) United States Patent
Saitoh

(10) Patent No.: US 8,756,414 B2
(45) Date of Patent: Jun. 17, 2014

(54) INFORMATION PROCESSING APPARATUS, SOFTWARE VERIFICATION METHOD, AND SOFTWARE VERIFICATION PROGRAM

(75) Inventor: Atsuhisa Saitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1386 days.

(21) Appl. No.: 12/045,333

(22) Filed: Mar. 10, 2008

(65) Prior Publication Data
US 2008/0229426 A1    Sep. 18, 2008

(30) Foreign Application Priority Data

Mar. 15, 2007  (JP) ................................ 2007-067252

(51) Int. Cl.
*H04L 29/06* (2006.01)
(52) U.S. Cl.
USPC ........................................................ 713/156
(58) Field of Classification Search
USPC .................... 726/2–6, 10, 17–19, 21–27, 30; 707/661–666, 687, 689, 705, 758, 770, 707/803; 711/100; 713/156, 173, 176, 189; 717/126, 154; 380/1, 202; 714/732
See application file for complete search history.

(56) References Cited

U.S. PATENT DOCUMENTS

| | | | |
|---|---|---|---|
| 7,063,253 B1 * | 6/2006 | Brausch et al. ............... | 235/379 |
| 7,263,608 B2 * | 8/2007 | Challener et al. ............. | 713/156 |
| 7,409,554 B2 * | 8/2008 | Ishibashi et al. .............. | 713/175 |
| 7,640,403 B2 * | 12/2009 | Matsushima .................. | 711/154 |
| 7,971,783 B1 * | 7/2011 | Crews et al. .................. | 235/379 |

FOREIGN PATENT DOCUMENTS

| | | |
|---|---|---|
| JP | 2002-162899 | 6/2002 |
| JP | 2003-507785 | 2/2003 |
| JP | 2005-148934 | 6/2005 |
| JP | 2006-50355 | 2/2006 |
| JP | 2006-323814 | 11/2006 |
| JP | 2006-345353 | 12/2006 |
| JP | 2007-52618 | 3/2007 |
| WO | WO 01/13199 A1 | 2/2001 |

OTHER PUBLICATIONS

Office Action issued Dec. 13, 2011 in Japanese Patent Application No. 2007-067252.
Office Action issued May 8, 2012, in Japanese Patent Application No. 2007-067252.

* cited by examiner

*Primary Examiner* — Edward Zee
*Assistant Examiner* — Leynna Truvan
(74) *Attorney, Agent, or Firm* — Oblon, Spivak, McClelland, Maier & Neustadt, L.L.P.

(57) ABSTRACT

An information processing apparatus is disclosed that includes an expiration detection unit that detects expiration of a certificate used for verifying the validity of software; a software verification unit that verifies the validity of the software using the certificate; and a storage unit in which the certificate is stored. In the apparatus, the software verification unit previously stores a value uniquely calculated from the software in the storage unit when the certificate has not expired and the software is valid, and verifies the validity of the software using the value uniquely calculated from the software where the certificate has expired or the software is invalid.

17 Claims, 13 Drawing Sheets

INFORMATION PROCESSING APPARATUS, SOFTWARE VERIFICATION METHOD, AND SOFTWARE VERIFICATION PROGRAM

BACKGROUND OF THE INVENTION

1. Field of the Invention

The present invention relates generally to information processing apparatuses, software verification methods, and software verification programs and, in particular, to an information processing apparatus that verifies the validity of software to be operated, a software verification method for use in the information processing apparatus, and a software verification program.

2. Description of the Related Art

In a multifunction peripheral (hereinafter referred to as MFP) as an example of an information processing apparatus, it is necessary to verify the validity of software to be operated so as to ensure its security. For example, if the MFP permits unauthorized software to be operated, there are possibilities of causing operations not intended by users and unauthorized accesses to data accumulated by the users.

Verifying the validity of software is included also in required specifications of the MFP (Protection Profile/PP in authentication scheme ISO15408/Common Criteria/CC of information security equipment), which have been promoted to be standardized by IEEE P2600. For example, Patent Document 1 discloses a computer platform in which the validity of an application to be operated is verified to determine its operational capability.

Patent Document 1: Japanese Patent Application National Laid-Open Publication No. 2003-507785

SUMMARY OF THE INVENTION

Some of the typical MFPs make use of a digital signature as a structure of verifying the validity of software. However, these MFPs have not taken into consideration cases where the digital signature has expired and where a common route key used in the digital signature has been leaked.

For example, it is inconvenient that the MFP is not available every time the digital signature becomes invalid like cases where the digital signature has expired and where the common route key used in the digital signature has been leaked (compromised).

The present invention has been made in view of the above problem and may provide an information processing apparatus, a software verification method, and a software verification program capable of verifying the validity of software even where a digital signature becomes invalid.

According to one aspect of the present invention, there is provided an information processing apparatus that verifies validity of software to be operated. The apparatus comprises an expiration detection unit that detects expiration of a certificate used for verifying the validity of the software; a software verification unit that verifies the validity of the software using the certificate; and a storage unit in which the certificate is stored. The software verification unit previously stores a value uniquely calculated from the software in the storage unit when the certificate has not expired and the software is valid, and verifies the validity of the software using the value uniquely calculated from the software where the certificate has expired or the software is invalid.

According to another aspect of the present invention, there is provided a software verification method of an information processing apparatus that verifies validity of software to be operated. The method comprises an expiration detection step of detecting expiration of a certificate used for verifying the validity of the software; a software verification step of verifying the validity of the software using the certificate; and a storage step of storing the certificate. In the software verification step, a value uniquely calculated from the software is previously stored in a storage unit when the certificate has not expired and the software is valid, and the validity of the software is verified using the value uniquely calculated from the software where the certificate has expired or the software is invalid.

According to still another aspect of the present invention, there is provided a software verification program causing an information processing apparatus that verifies validity of software to be operated to conduct an expiration detection procedure for detecting expiration of a certificate used for verifying the validity of the software; a software verification procedure for verifying the validity of the software using the certificate; and a storage procedure for storing the certificate. In the software verification procedure, a value uniquely calculated from the software is previously stored in the storage unit when the certificate has not expired and the software is valid, and the validity of the software is verified using the value uniquely calculated from the software where the certificate has expired or the software is invalid.

Note that the application of any combination of the expressions or constituents of the present invention to a method, an apparatus, a system, a computer program, a recording medium, a data structure, or the like is also effective as the embodiments of the present invention.

According to embodiments of the present invention, it is possible to provide an information processing apparatus, a software verification method, and a software verification program capable of verifying the validity of software even where a digital signature becomes invalid.

Other objects, features and advantages of the present invention will become more apparent from the following detailed description when read in conjunction with the accompanying drawings.

DETAILED DESCRIPTION OF THE PREFERRED EMBODIMENTS

Next, referring to the accompanying drawings, a description is made of the best mode for carrying out the present invention based on the embodiments described below. Note that a MFP as an information processing apparatus is an example of an equipment-incorporated system configured to achieve a function. First, a process for verifying the validity of software using a TPM (Trusted Platform Module) is described in order to facilitate the understanding of the embodiments of the present invention.

Figure 1:
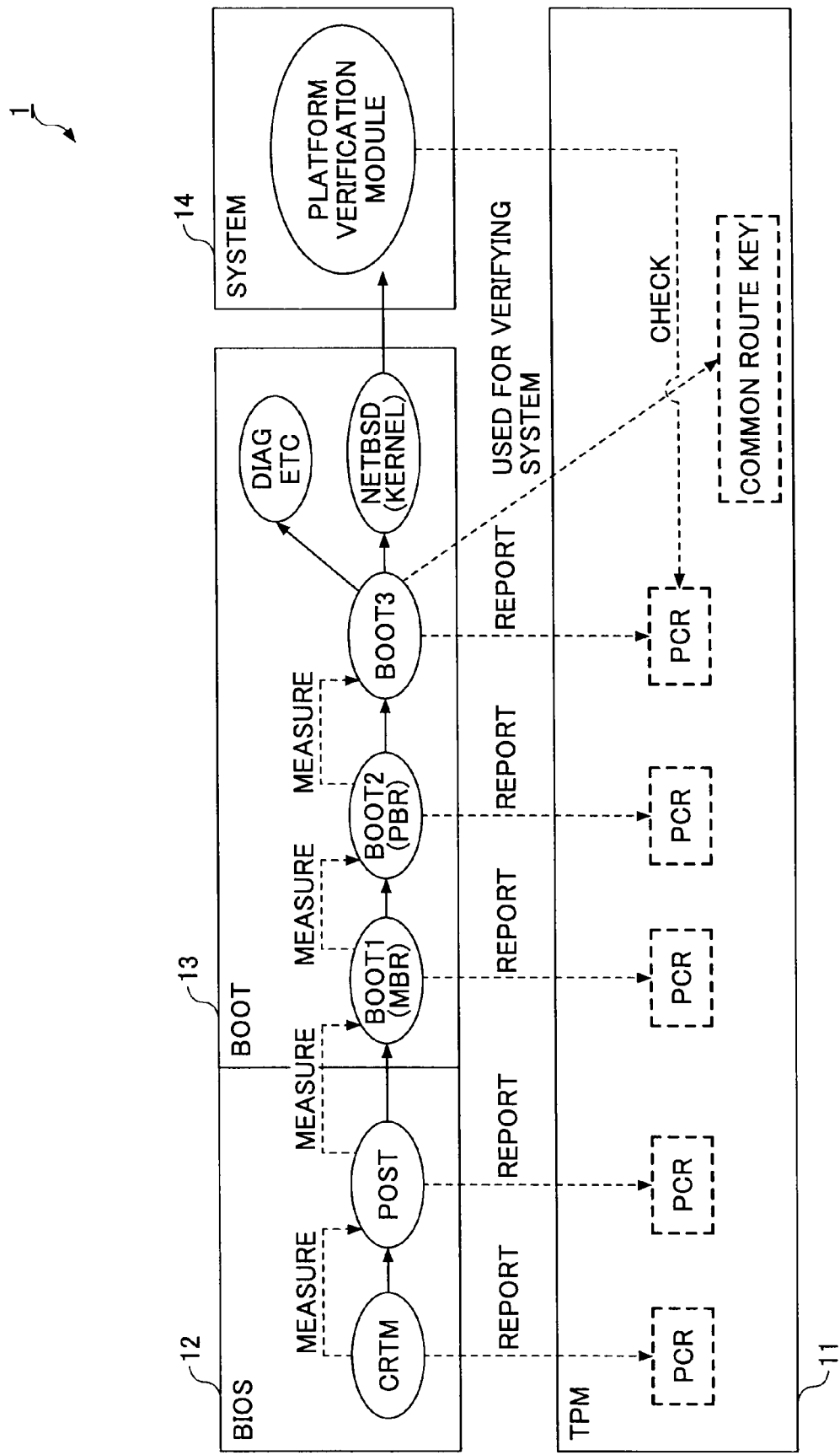
FIG. 1 is a diagram of an example showing a process for verifying the validity of software using a TPM.

FIG. 1 is a diagram of an example showing a process for verifying the validity of software using the TPM. The TPM 11 is realized, for example, by a chip directly mounted on a motherboard. When the MFP 1 is activated, hash values calculated by a calculation method, in which fixed-length pseudo random numbers are generated from original texts of a CRTM and a POST of a BIOS 12 and boots 1 through 3 and a netbsd of a Boot 13, are stored in PCRs (Platform Configuration Registers) of the TPM 11. As the MFP 1 is activated, the hash values according to firmware are stored in the PCRs of the TPM 11.

Note that the verification specification from the CRTM of the BIOS 12 to the boot1 (MBR) of the Boot 13 is defined by a TCG (Trusted Computing Group). Solid lines with an arrow in FIG. 1 show activation flows. Dotted lines with an arrow show verification actions. The implementation of "measure" in FIG. 1 is based on the TCG method. Furthermore, "Report" in FIG. 1 expresses the report of the hash values to the TPM 11.

Modules such as the netbsd (kernel), a diag, and a platform verification module of a System 14, which are activated after the boot 3 of the Boot 13, are authenticated by the SERES authentication (RSA authentication) system. The TPM 11 performs access control based on the hash values stored in the PCRs.

The MFP 1 stores in the PCRs of the TPM 11 the hash values uniquely calculated from respective modules constituting the firmware and sets the hash values registered in the PCRs as access conditions for a common route key, thereby protecting the common route key from data theft by an unauthorized system. In other words, the MFP 1 performs access control of the common route key by using a structure of the TPM 11 even for the Boot 13 as the firmware. Specifically, the MFP 1 previously encrypts the common route key and protects a decryption key with the structure of the TPM 11, thereby performing the access control of the common route key.

The MFP 1 realizes verifying the validity of applications (software programs) such as a copier and a scanner higher than the System 14 by imparting the digital signature obtained by encrypting the hash values of the applications and then checking the digital signature using the common route key stored in the TPM 11.

Figure 2:
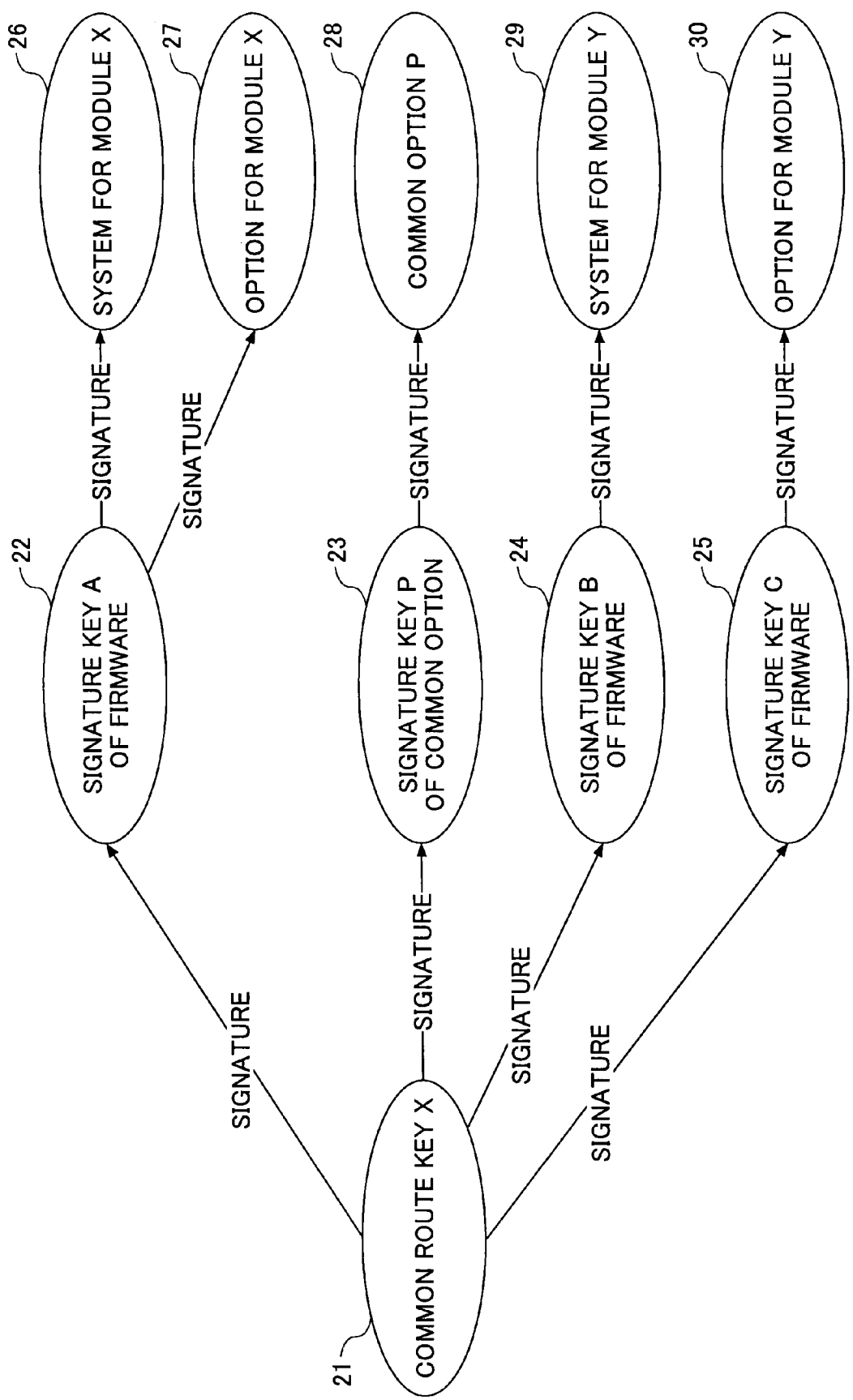
FIG. 2 is a diagram of an example showing the relationship between a common route key, a signature key of firmware, and a digital signature.

FIG. 2 is a diagram of an example showing the relationship between the common route key, the signature keys of firmware modules, and the digital signature. As shown in FIG. 2, the common route key 21 is used for the digital signature of the signature keys 22 through 25. Furthermore, the signature keys 22 through 25 are used for the digital signatures of various modules 26 through 30 such as systems, options, and a common option.

Figure 3:
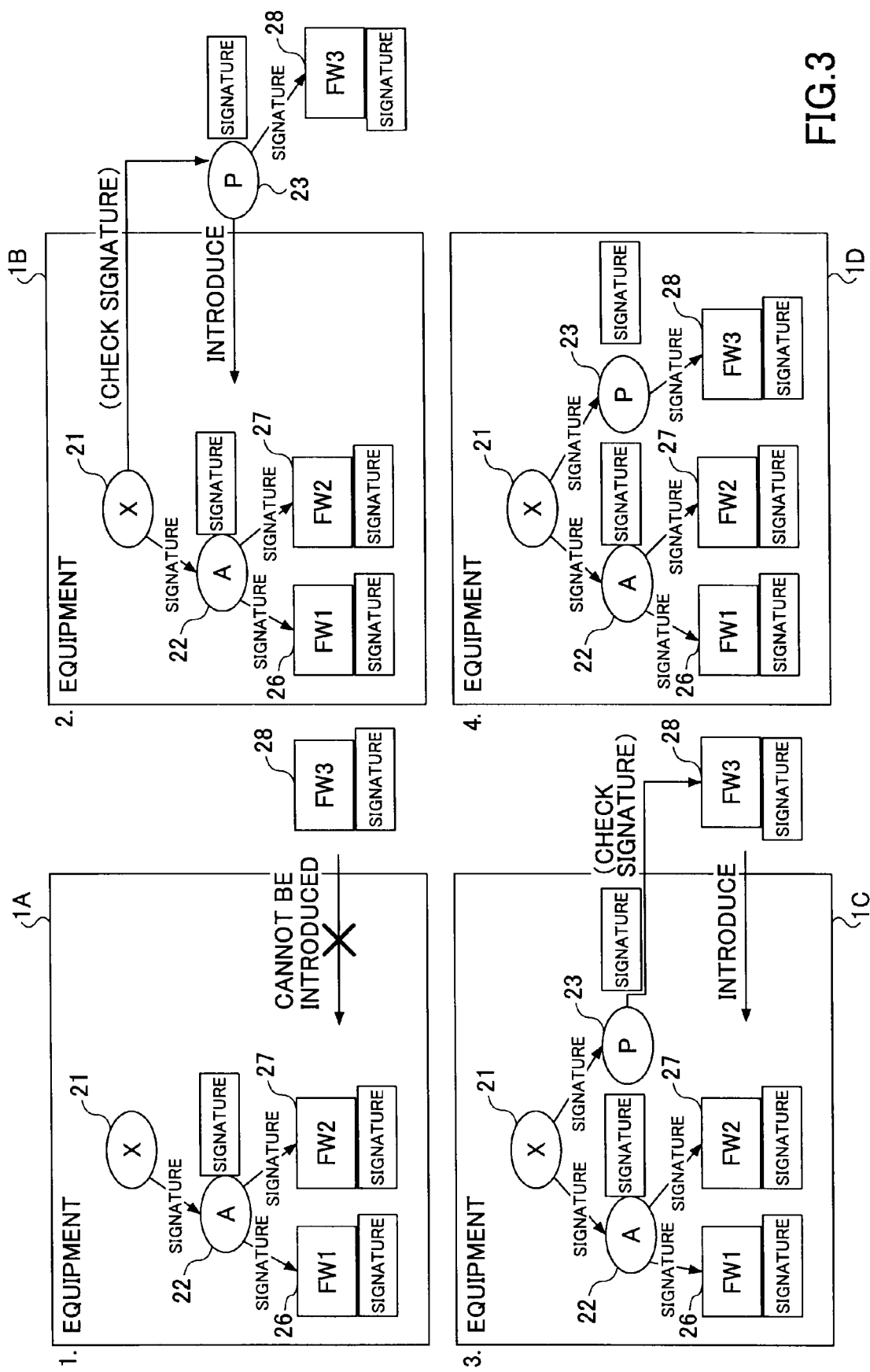
FIG. 3 is a diagram of an example showing a structure of checking the digital signature at the installation of a module.

FIG. 3 is a diagram of an example showing a structure of checking the digital signature at the installation of a module. The MFPs 1A through 1D show the installation of the module as time advances. Furthermore, the MFP 1A shows where the common option 28 cannot be introduced as it is.

The MFP 1B shows where the signature key 23 of the common option is introduced after the digital signature of the signature key 23 of the common option is checked using the common route key 21. The MFP 1C shows where the common option 28 is introduced as shown in the MFP 1D after the digital signature of the common option 28 is checked using the signature key 23 of the common option.

In the MFP 1 of the embodiments of the present invention, it is necessary to check the validity of the digital signature for use in verifying the validity of software, assuming that the common route key 21 may be imperiled or leaked due to the cracking (unauthorized access) of the location where the common route key 21 is stored.

Figure 4:
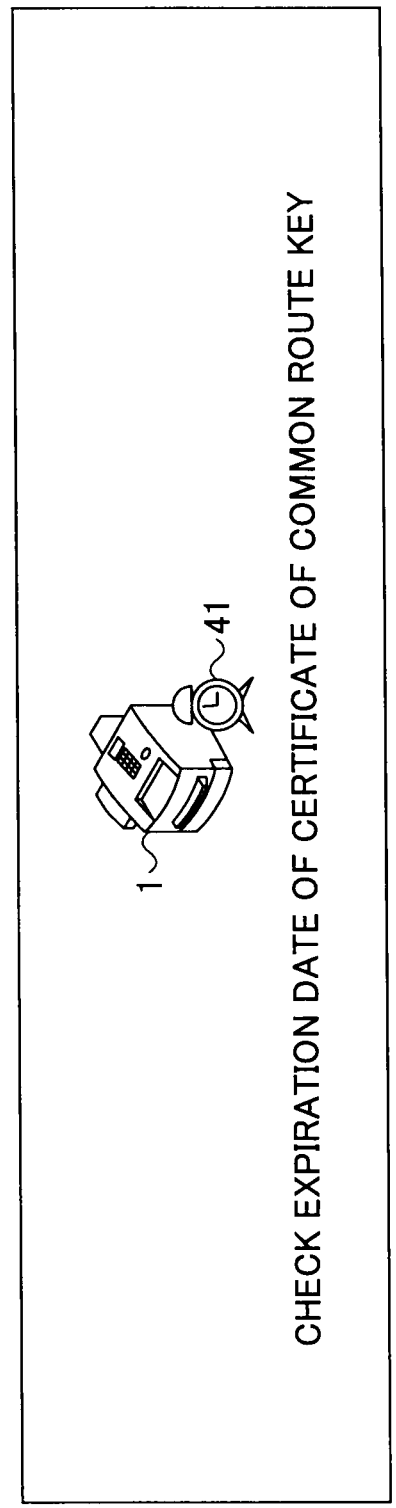
FIG. 4 is a diagram of a method of checking the validity of the certificate of the common route key.
Figure 5:
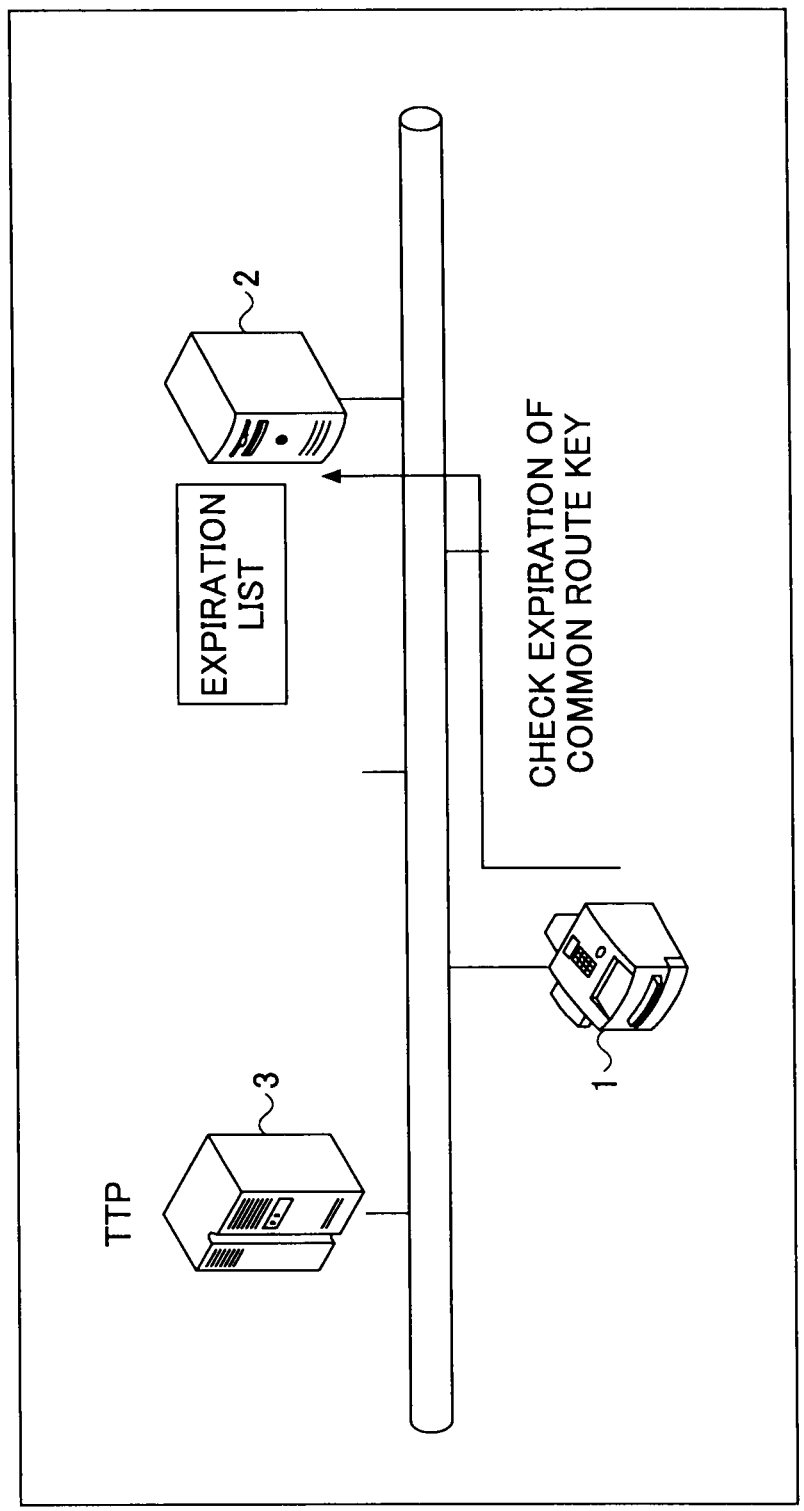
FIG. 5 is a diagram of another method of checking the validity of the certificate of the common route key.

FIG. 4 is a diagram of a method of checking the validity of the certificate of the common route key. The MFP 1 in FIG. 4 checks the expiration date of the certificate of the common route key stored in the TPM 11 with an internal clock 41, thereby checking the validity of the certificate of the common route key. FIG. 5 is a diagram of another method of checking the validity of the certificate of the common route key. The MFP 1 in FIG. 5 checks a list of expired certificates of common route keys (expiration list) disclosed by an external server 2, thereby checking the validity of the certificate of the common route key. FIG. 5 includes a server 3 of a trusted third party (TTP).

Below, a description is separately made of a first embodiment in which the validity of software is verified where the certificate of the common route key and the certificate of the signature key of an application have expired and a second embodiment in which the validity of software is verified where the certificate of the common route key and the certificate of the signature key of an application are registered on the expiration list (the certificate of the common route key and the signature key of the application have expired).

First Embodiment

Figure 6:
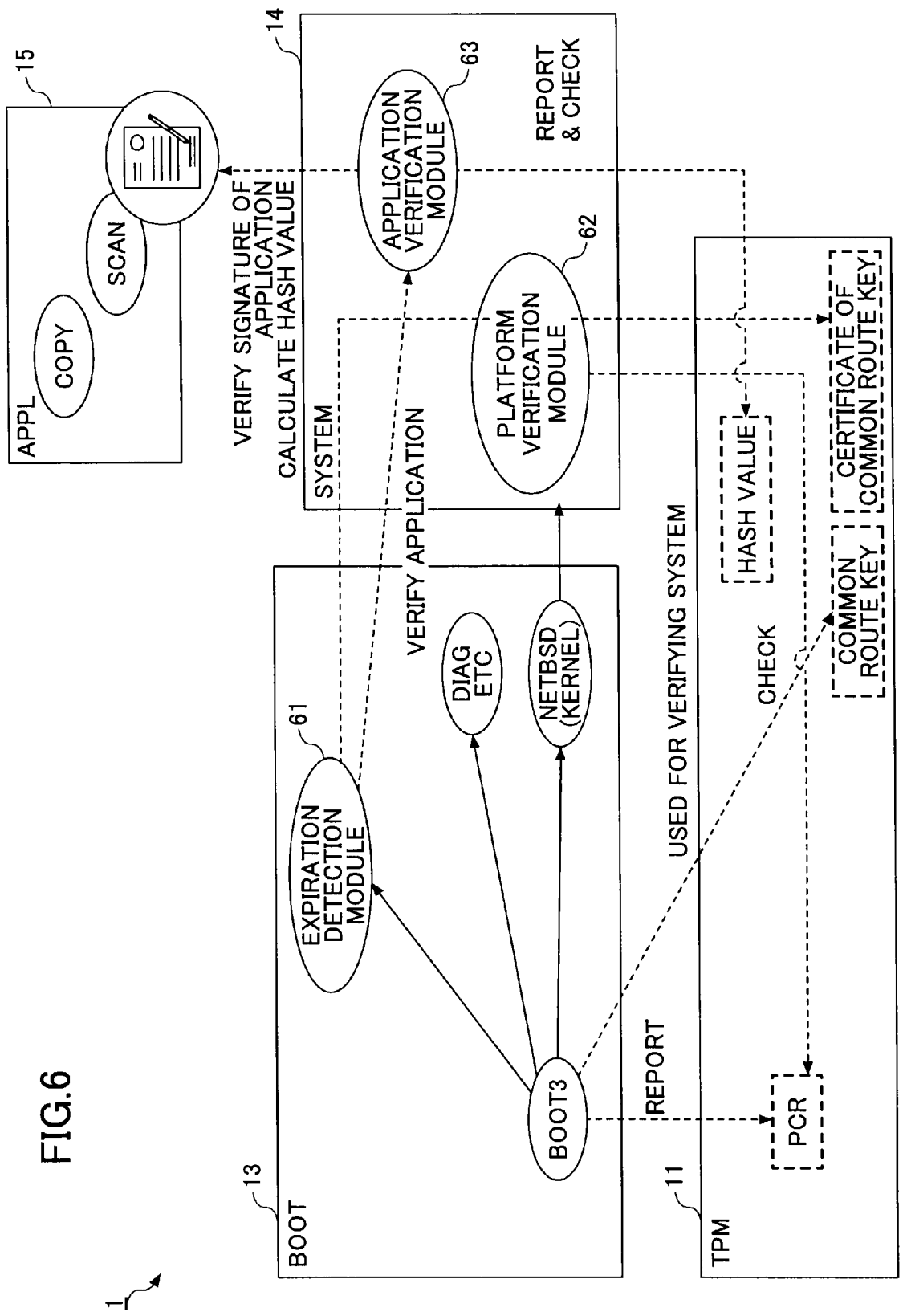
FIG. 6 is a diagram of an example showing a process for verifying the validity of software where the certificate of the common route key has expired.

FIG. 6 is a diagram of an example showing a process for verifying the validity of software where the certificate of the common route key has expired. A first embodiment refers to a case where the common route key of the MFP 1 has expired in a time-limited manner. The MFP 1 of the first embodiment determines the time-limited expiration of the common route key using the expiration date of the certificate of the common route key.

The Boot 13 of the MFP 1 in FIG. 6 has an expiration detection module 61 that detects the time-limited expiration of the common route key using the expiration date of the certificate of the common route key. The System 14 of the MFP 1 has a platform verification module 62 that verifies the validity of a platform and an application verification module 63 that verifies the validity of an application 15.

The MFP 1 in FIG. 6 previously stores the hash value of the application 15 that is in a normal operating state before the common route key is imperiled. Where the common route key is imperiled, the MFP 1 verifies the validity of the application 15 based on the previously stored hash value of the application 15 that is in a normal operating state.

Figure 7:
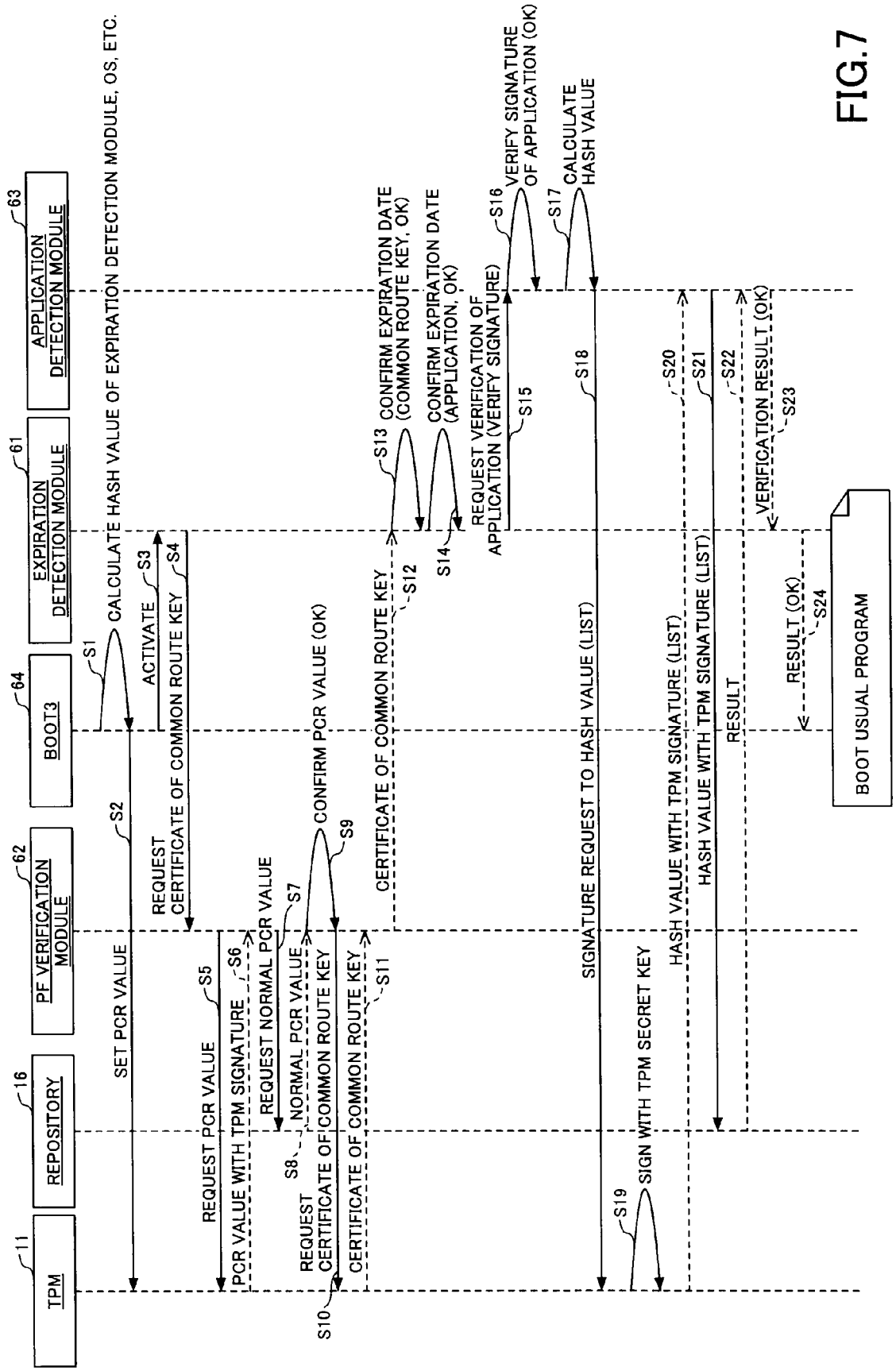
FIG. 7 is a sequence diagram of an example showing the operations of a MFP where the certificate of the common route key has not expired.

FIG. 7 is a sequence diagram of an example showing the operations of the MFP where the certificate of the common route key has not expired. The process proceeds to step S1 where the boot3 64 calculates the hash values of the expiration detection module 61, the netbsd (kernel), and the like.

The process proceeds to step S2 where the boot3 64 stores the calculated hash values in the PCR of TPM 11. The process proceeds to step S3 where the boot3 64 activates the expiration detection module 61. The process proceeds to step S4 where the expiration detection module 61 requests the certificate of the common route key from the platform verification module 62.

The process proceeds to step S5 where the platform verification module 62 requests a PCR value stored in the PCR from the TPM 11. The process proceeds to step S6 where the TPM 11 transmits the PCR value with a TPM signature to the platform verification module 62.

The process proceeds to step S7 where the platform verification module 62 requests a normal PCR value from a repository 16. The process proceeds to step S8 where the platform verification module 62 receives the normal PCR value from the repository 16.

The process proceeds to step S9 where the platform verification module 62 confirms whether the PCR value with the TPM signature is identical to the normal PCR value. If the PCR value with the TPM signature is identical to the normal PCR value, the platform verification module 62 determines that the Boot 13 is valid. Here, it is assumed that the PCR value with the TPM signature is identical to the normal PCR value.

The process proceeds to step S10 where the platform verification module 62 requests the certificate of the common route key from the TPM 11. The process proceeds to step S11 where the platform verification module 62 receives the certificate of the common route key from the TPM 11.

The process proceeds to step S12 where the platform verification module 62 transmits the certificate of the common route key to the expiration detection module 61. The process proceeds to step S13 where the expiration detection module 61 confirms the expiration date of the certificate of the common route key. Here, it is assumed that the certificate of the common route key has not expired.

The process proceeds to step S14 where the expiration detection module 61 confirms the expiration dates of the certificates of the signature keys of the respective applications 15. Here, it is assumed that the certificates of the signature keys of the respective applications 15 have not expired. The process proceeds to step S15 where the expiration detection module 61 requests the application verification module 63 to verify the validity of the respective applications 15.

The process proceeds to step S16 where the application verification module 63 verifies the digital signatures of the respective applications 15. Here, it is assumed that the digital signatures are correct. The process proceeds to step S17 where the application verification module 63 calculates the hash values of the respective applications 15. The process proceeds to step S18 where the application verification module 63 requests the TPM 11 to sign the hash values of the respective applications 15.

Note that this signature request may be made for each of the hash values of the respective applications 15, or it may be made for a list of the hash values of all the applications 15. As a combination thereof, the signature request may be made for each of the hash values of the respective applications 15 and the list of the hash values of all the applications 15.

If the signature request is made for each of the hash values of the respective applications 15, it is easy to deal with a case where the expiration date of each application 15 has expired. Furthermore, if the signature request is made for the list of the hash values of all the applications 15, it requires fewer steps in verifying the digital signature at a later stage.

The process proceeds to step S19 where the TPM 11 performs the digital signature with respect to the hash values of the respective applications 15 or the list of the hash values using the common route key (secret key) stored in the TPM 11. The process proceeds to step S20 where the TPM 11 transmits the hash values with the TPM signature or the list of the hash values with the TPM signature to the application verification module 63.

The process proceeds to step S21 where the application verification module 63 stores the hash values with the TPM signature or the list of the hash values with the TPM signature in the repository 16. The process proceeds to step S22 where the application verification module 63 receives the result of storing the hash values with the TPM signature or the list of the hash values with the TPM signature from the repository 16. Here, it is assumed that the hash values with the TPM signature or the list of the hash values with the TPM signature can be stored.

The process proceeds to step S23 where the application verification module 63 informs the expiration detection module 61 of the result of verifying the validity of the respective applications 15. The process proceeds to step S24 where the expiration detection module 61 informs the boot3 64 of the result that the respective applications 15 are valid. Then, the boot3 64 activates the respective applications 15.

In the sequence diagram of FIG. 7, where both the certificate of the common route key and the certificates of the signature keys of the respective applications 15 have not expired and the digital signatures of the respective applications 15 are correct, the hash values with the TPM signature or the list of the hash values with the TPM signature obtained by performing the digital signature with respect to the hash values of the respective applications 15 or the list of the hash values are stored in the repository 16.

As a result, the MFP 1 that performs the processing as shown in the sequence diagram of FIG. 7 can obtain the hash values of software that is in a normal operating state or the list of the hash values. Where the certificate of the common route key has expired, the MFP 1 verifies the validity of the application 15 in the manner shown in FIG. 8, using the hash values or the list of the hash values obtained by the processing as shown in FIG. 7.

Figure 8:
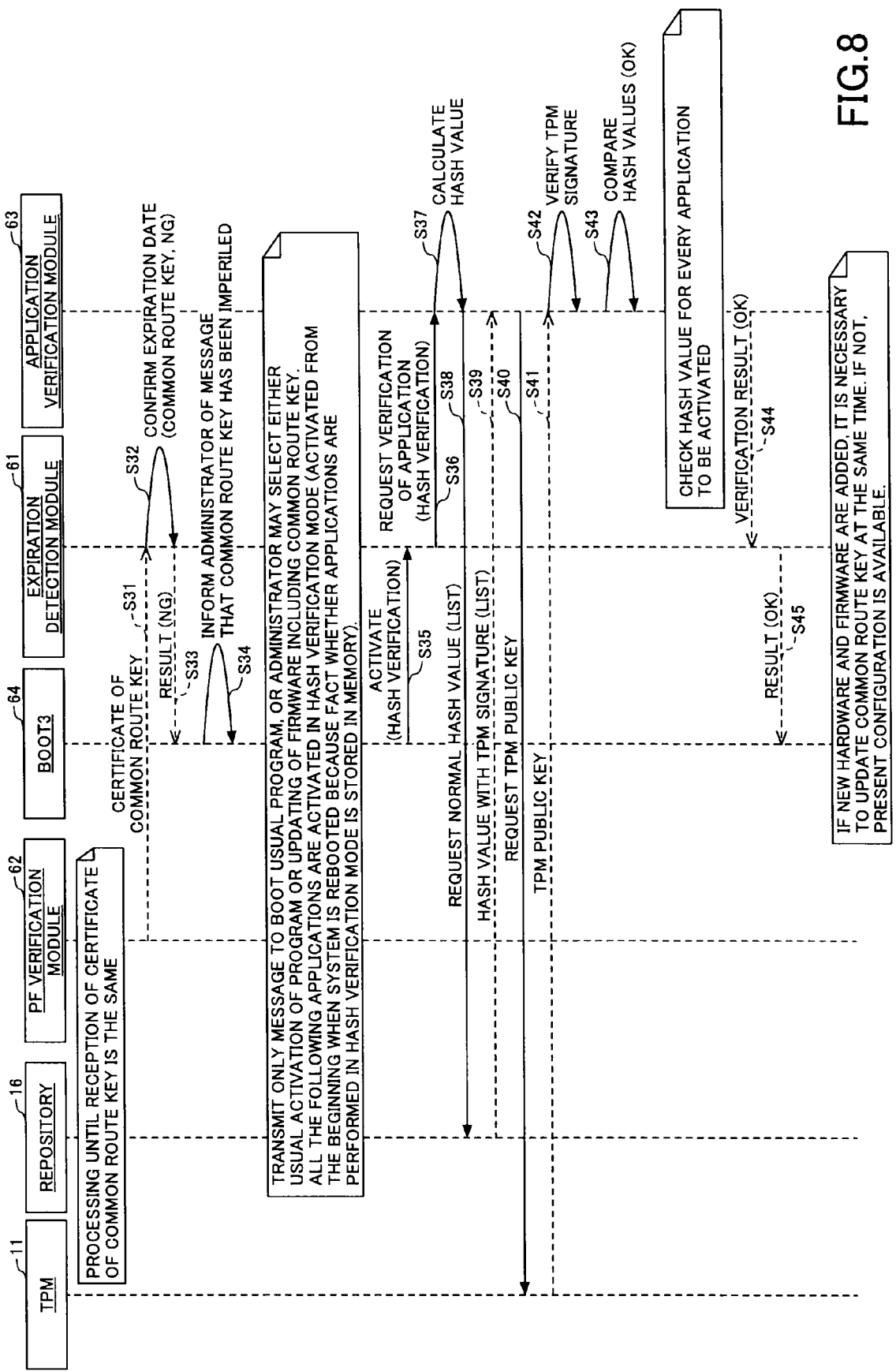
FIG. 8 is a sequence diagram of an example showing the operations of the MFP where the certificate of the common route key has expired.

FIG. 8 is a sequence diagram of an example showing the operations of the MFP where the certificate of the common route key has expired. Since the processing of step S31 until the expiration detection module 61 receives the certificate of the common route key is the same as the processing of steps S1 through S12 in FIG. 7, the diagrammatic representation and description of the processing are omitted.

The process proceeds to step S32 where the expiration detection module 61 confirms the expiration date of the certificate of the common route key. Here, it is assumed that the certificate of the common route key has expired. The process proceeds to step S33 where the expiration detection module 61 informs the boot3 64 of the result that the certificate of the common route key has expired. The process proceeds to step S34 where the boot3 64 informs an administrator or the like of a message that the common route key has been imperiled.

Note that the MFP 1 may inform the administrator or the like of the message to activate the respective applications 15. The MFP 1 may cause the administrator or the like to select either the activation of the respective applications 15 or the updating of firmware including the common route key.

In the following, all the applications 15 are activated in a hash verification mode. Since the fact whether they are activated in the hash verification mode is stored in a memory, the processing until step S34 is performed from the beginning when the MFP 1 is rebooted.

The process proceeds to step S35 where the boot3 64 activates the expiration detection module 61 in the hash verification mode. The process proceeds to step S36 where the expiration detection module 61 requests the application verification module 63 to verify the validity of the respective applications 15 in the hash verification mode. The process proceeds to step S37 where the application verification module 63 calculates the hash values of the respective applications 15.

The process proceeds to step S38 where the application verification module 63 requests normal hash values or a list of the hash values from the repository 16. The process proceeds to the step S39 where the application verification module 63 receives the hash values with the TPM signature or the list of the hash values with the TPM signature from the repository 16.

The process proceeds to step S40 where the application verification module 63 requests a common route key (public key) from the TPM 11. The process proceeds to step S41 where the application verification module 63 receives the public key from the TPM 11. The process proceeds to step S42 where the application verification module 63 verifies the TPM signature using the public key. Here, it is assumed that the TPM signature is correct.

The process proceeds to step S43 where the application verification module 63 confirms, using the public key, whether the hash values with the TPM signature or the hash values on the list are identical to the hash values of the respective applications 15 calculated in step S37. Here, it is assumed that the hash values with the TPM signature or the hash values on the list are identical to the hash values of the respective applications 15 calculated in step S37.

The process proceeds to step S44 where the application verification module 63 informs the expiration detection module 61 of the result of verifying the validity of the respective applications 15. The process proceeds to step S45 where the expiration detection module 61 informs the boot3 64 of the result that the respective applications 15 are valid. Then, the boot3 64 activates the respective applications 15.

Note that if new hardware and firmware are added, it is necessary to update the common route key at the same time. If not, the present configuration is available.

Figure 9:
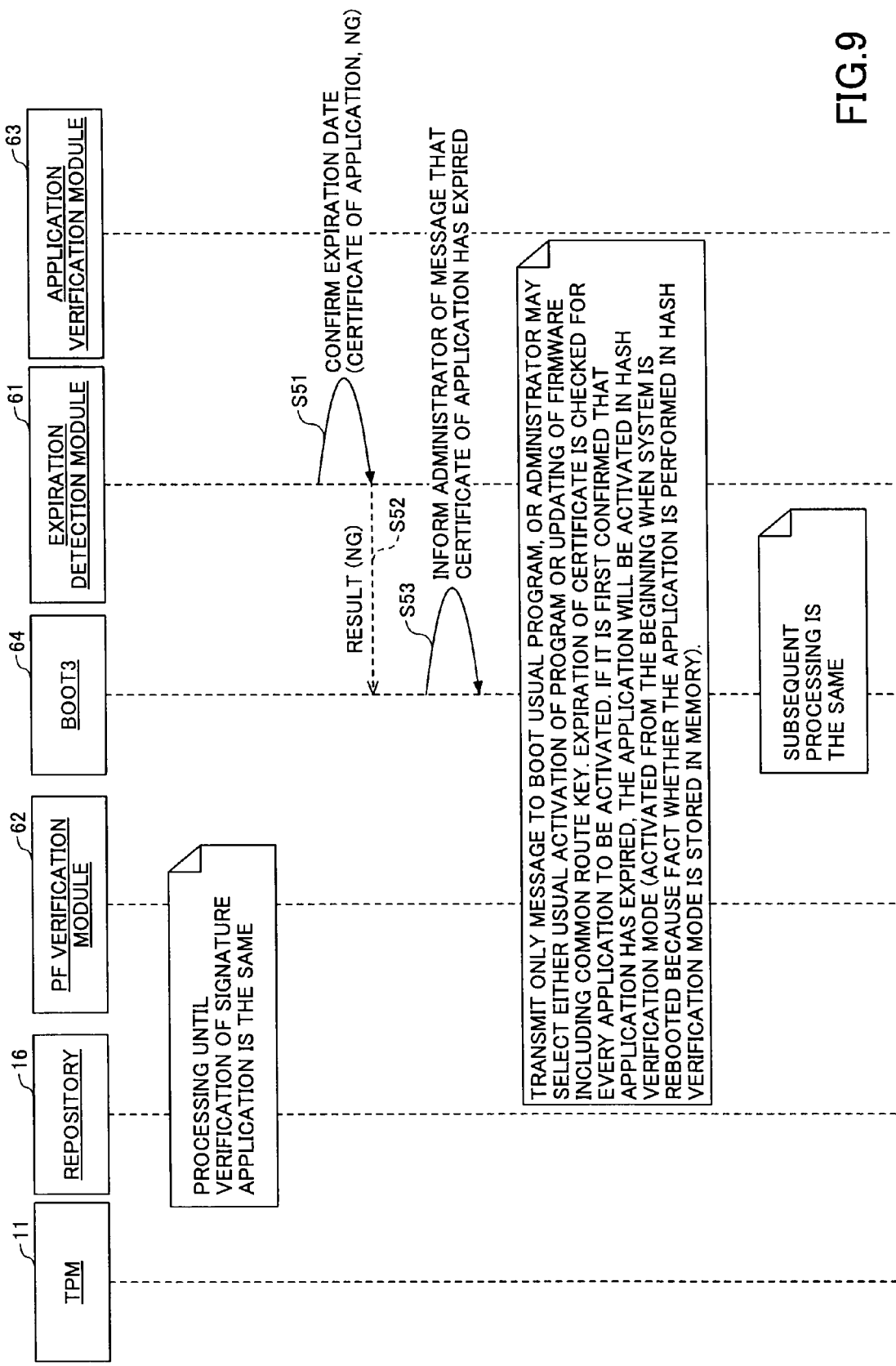
FIG. 9 is a sequence diagram of an example showing the operations of the MFP where the certificate of the signature key of an application has expired.

As a result, where the certificate of the common route key has expired, the MFP 1 that performs the processing as shown in the sequence diagram of FIG. 8 can verify the validity of the applications 15 not with the digital signatures of the respective applications 15 but with the hash values thereof. Furthermore, the MFP 1 can inform the administrator or the like of the fact that the common route key has been imperiled.

Where the certificate of the signature key of the respective applications 15 has expired, the MFP 1 verifies the validity of the applications 15 as shown in FIG. 9 using the hash values or the list of the hash values obtained by the processing shown in the sequence diagram of FIG. 7.

FIG. 9 is a sequence diagram of an example showing the operations of the MFP where the certificate of the signature key of the application 15 has expired. Since the processing until the expiration detection module 61 confirms the expiration date of the certificate of the common route key is the same as the processing of steps S1 through S13 in FIG. 7, the diagrammatic representation and description of the processing are omitted.

The process proceeds to steps S51 where the expiration detection module 61 confirms the expiration date of the certificate of the signature key of the application 15. Here, it is assumed that the certificate of the signature key of the application 15 has expired.

The process proceeds to step S52 where the expiration detection module 61 informs the boot3 64 of the result that the certificate of the signature key of the application 15 has expired. The process proceeds to step S53 where the boot3 64 informs the administrator or the like of a message that the certificate of the signature key of the application 15 has expired.

Note that the MFP 1 may inform the administrator or the like of the message to activate the respective applications 15. The MFP 1 may cause the administrator or the like to select either the activation of the respective applications 15 or the updating thereof. The expiration date of the certificate of the signature key in step S51 is confirmed for every application 15 to be activated.

If it is first confirmed that the certificate of the signature key has expired, the application 15 is activated in the hash verification mode. Since the fact whether the application 15 is activated in the hash verification mode is stored in a memory, the processing until step S53 is performed from the beginning when the MFP 1 is rebooted. Since the following processing is the same as the processing after step S35 in FIG. 8, the description of the processing is omitted.

As a result, where the certificate of the signature key of the application 15 has expired, the MFP 1 that performs the processing as shown in the sequence diagram of FIG. 9 can verify the validity of the applications 15 not with the digital signature of the respective applications but with the hash values thereof. Furthermore, the MFP 1 can inform the administrator or the like of the fact that the certificate of the signature key of the application 15 has expired.

Second Embodiment

Figure 10:
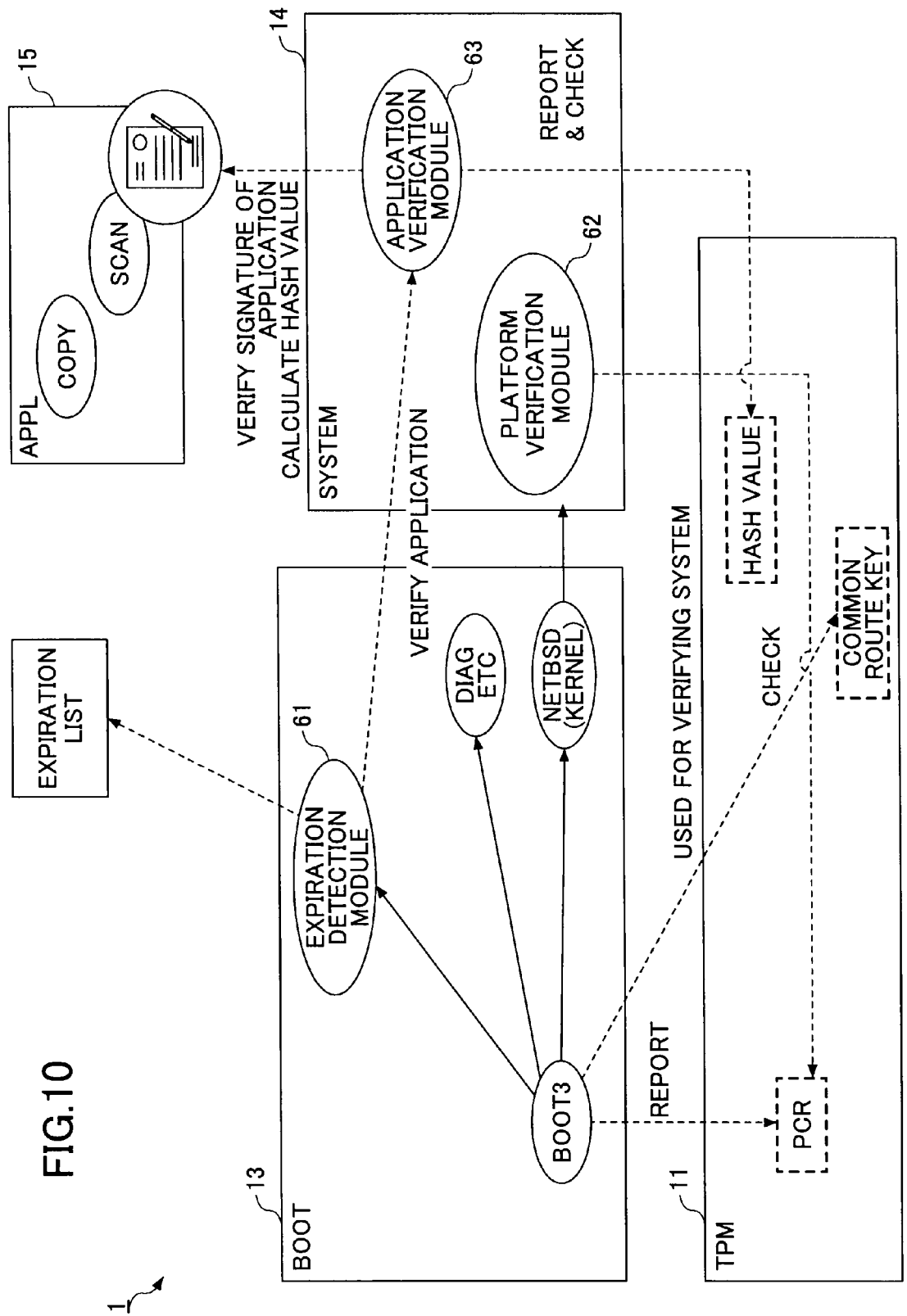
FIG. 10 is a diagram of an example showing a process for verifying the validity of software where the certificate of the common route key is registered on an expiration list.

FIG. 10 is a diagram of an example showing a process for verifying the validity of software where the certificate of the common route key is registered on the expiration list. In other words, the MFP 1 of a second embodiment can verify the validity of software even where the common route key (secret key) has been leaked due to the cracking.

The second embodiment refers to a case where the common route key in the MFP 1 has expired due to the cracking. The MFP 1 of the second embodiment determines the expiration of the common route key using the expiration list disclosed by the external server 2. The external server 2 is provided, for example, by a manufacturer of the MFP 1.

The Boot 13 of the MFP 1 in FIG. 10 has the expiration detection module 61 that detects the expiration of the common route key using the expiration list. The System 14 of the MFP 1 has the platform verification module 62 that verifies the validity of the platform and the application verification module 63 that verifies the validity of the application 15.

The MFP 1 in FIG. 10 previously stores the hash value of the application 15 that is in a normal operating state before the certificate of the common route key is registered on the expiration list. Where the certificate of the common route key is registered on the expiration list, the MFP 1 verifies the validity of the application 15 based on the previously stored hash value of the application 15 that is in a normal operating state.

The MFP 1 of the second embodiment is different from that of the first embodiment in access to the external server 2 and signature verification at the server 3 of the TTP. The MFP 1 of the second embodiment previously stores information such as locations (addresses) of the external server 2 and the server 3 of the TTP in the TPM 11. Furthermore, the MFP 1 may be structured so as to update the information of the external server 2 and the server 3 of the TTP during its normal activation. Moreover, the MFP 1 can keep information current while preventing the same from being tampered with by previously imparting the TPM signature to the external server 2 and the server 3 of the TTP during its normal activation.

Figure 11:
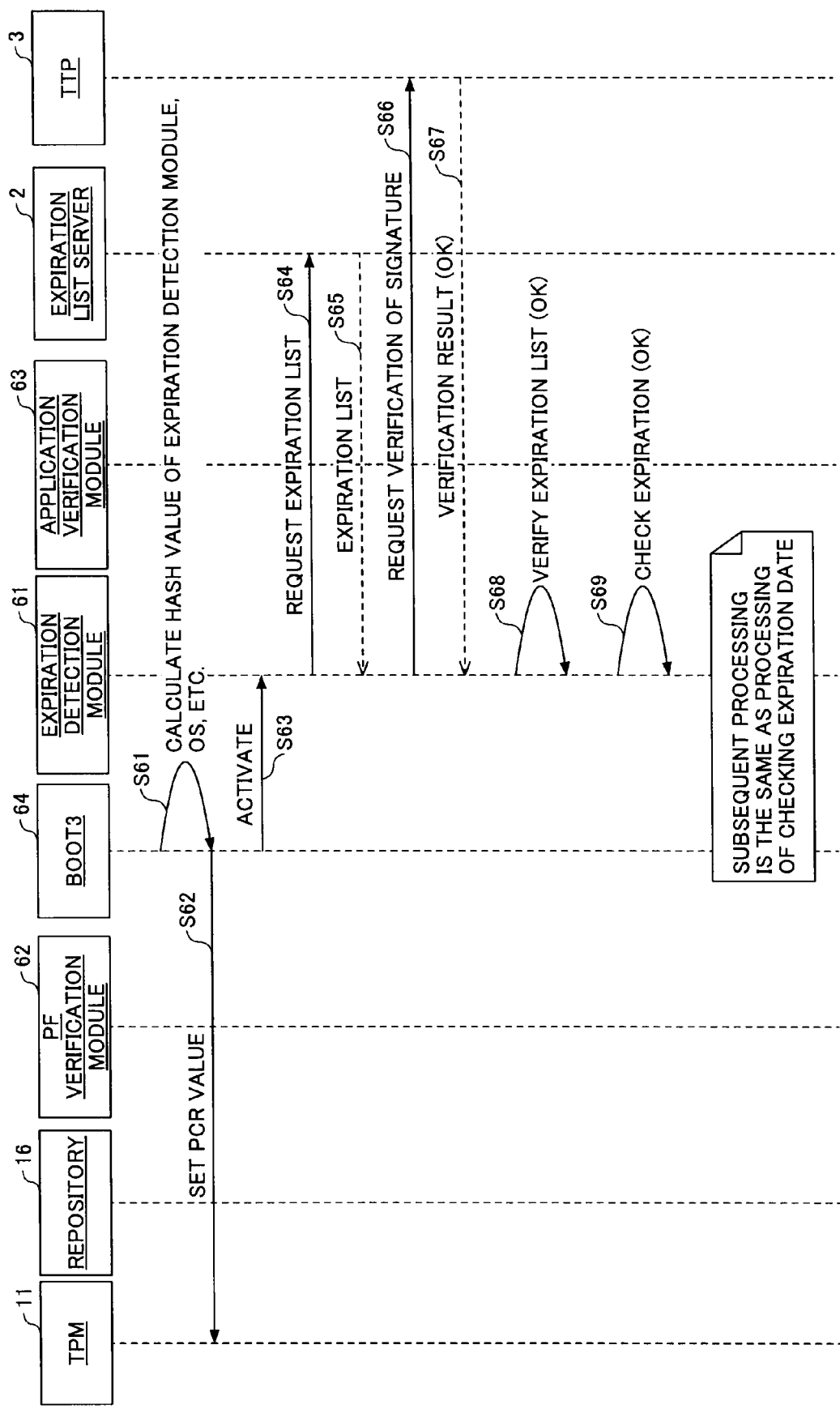
FIG. 11 is a sequence diagram of an example showing the operations of the MFP where the certificate of the common route key has not been registered on the expiration list.

FIG. 11 is a sequence diagram of an example showing the operations of the MFP where the certificate of the common route key is not registered on the expiration list. The process proceeds to step S61 where the boot3 64 calculates the hash values of the expiration detection module 61, the netbsd (kernel), and the like.

The process proceeds to step S62 where the boot3 64 stores the calculated hash values in the PCR of TPM 11. The process proceeds to step S63 where the boot3 64 activates the expiration detection module 61. The process proceeds to step S64 where the expiration detection module 61 requests the expiration list from the external server 2. The process proceeds to step S65 where the expiration detection module 61 receives the expiration list from the external server 2.

The process proceeds to step S66 where the expiration detection module 61 requests the server 3 of the TTP to verify the digital signature of the expiration list. The process proceeds to step S67 where the expiration detection module 61 receives the verification result from the server 3 of the TTP. Here, it is assumed that the digital signature of the expiration list is correct.

The process proceeds to step S68 where the expiration detection module 61 verifies whether the certificate of the common route key is registered on the expiration list. Here, it is assumed that the certificate of the common route key is not registered on the expiration list.

The process proceeds to step S69 where the expiration detection module 61 verifies whether the certificates of the signature keys of the respective applications 15 are registered on the expiration list. Here, it is assumed that the certificates of the signature keys of the respective applications 15 are not registered on the expiration list. Since the following processing is the same as the processing after step S15 in FIG. 7, the description thereof is omitted.

In the sequence diagram of FIG. 11, where both the certificate of the common route key and the certificates of the signature keys of the respective applications 15 have not expired (are not registered on the expiration list), the hash values with the TPM signature or the list of the hash values with the TPM signature obtained by performing the digital signature with respect to the hash values of the respective applications 15 or the list of the hash values are stored in the repository 16.

As a result, the MFP 1 that performs the processing as shown in the sequence diagram of FIG. 11 can obtain the hash values of software programs that are in a normal operating state or the list of the hash values. Where the certificate of the common route key is registered on the expiration list, the MFP 1 verifies the validity of the application 15 in the manner shown in FIG. 12 using the hash values or the list of the hash values obtained by the processing as shown in the sequence diagram of FIG. 11.

Figure 12:
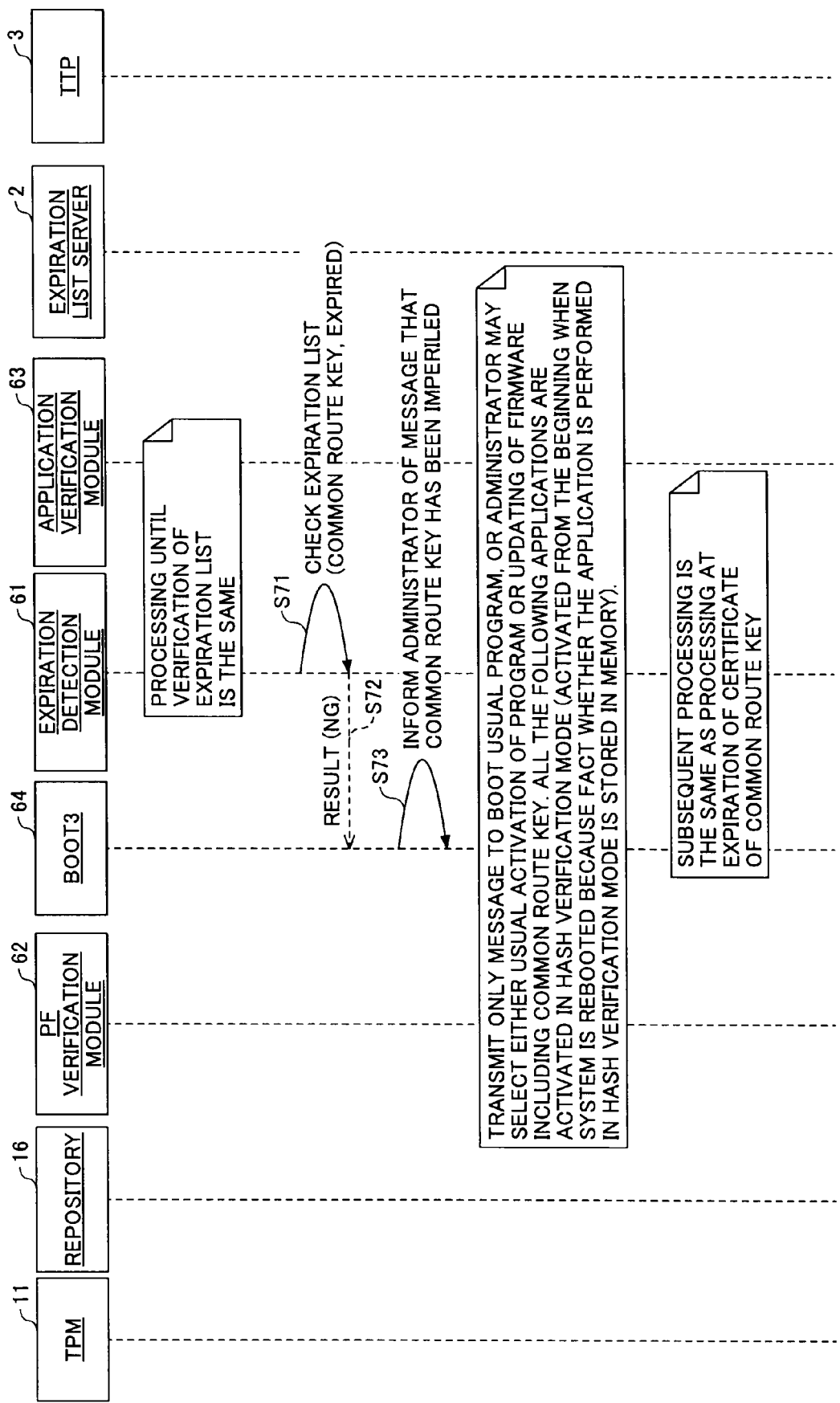
FIG. 12 is a sequence diagram of an example showing the operations of the MFP where the certificate of the common route key has been registered on the expiration list.

FIG. 12 is a sequence diagram of an example showing the operations of the MFP where the certificate of the common route key is registered on the expiration list. Since the processing before step S71 is the same as the processing of steps S61 through S67 in FIG. 11, the diagrammatic representation and description of the processing are omitted.

The process proceeds to step S71 where the expiration detection module 61 verifies whether the certificate of the common route key is registered on the expiration list. Here, it is assumed that the certificate of the common route key is registered on the expiration list. The process proceeds to step S72 where the expiration detection module 61 informs the boot3 64 of the result that the certificate of the common route key is registered on the expiration list. The process proceeds to step S73 where the boot3 64 informs the administrator or the like of a message that the common route key has been imperiled.

Note that the MFP 1 may inform the administrator or the like of the message to activate the respective applications 15. The MFP 1 may cause the administrator or the like to select either the activation of the respective applications 15 or the updating of firmware including the common route key.

In the following, all the applications 15 are activated in the hash verification mode. Since the fact whether they are activated in the hash verification mode is stored in a memory, the processing until step S73 is performed from the beginning when the MFP 1 is rebooted. Since the following processing is the same as the processing after step S35 in FIG. 8, the description thereof is omitted.

Figure 13:
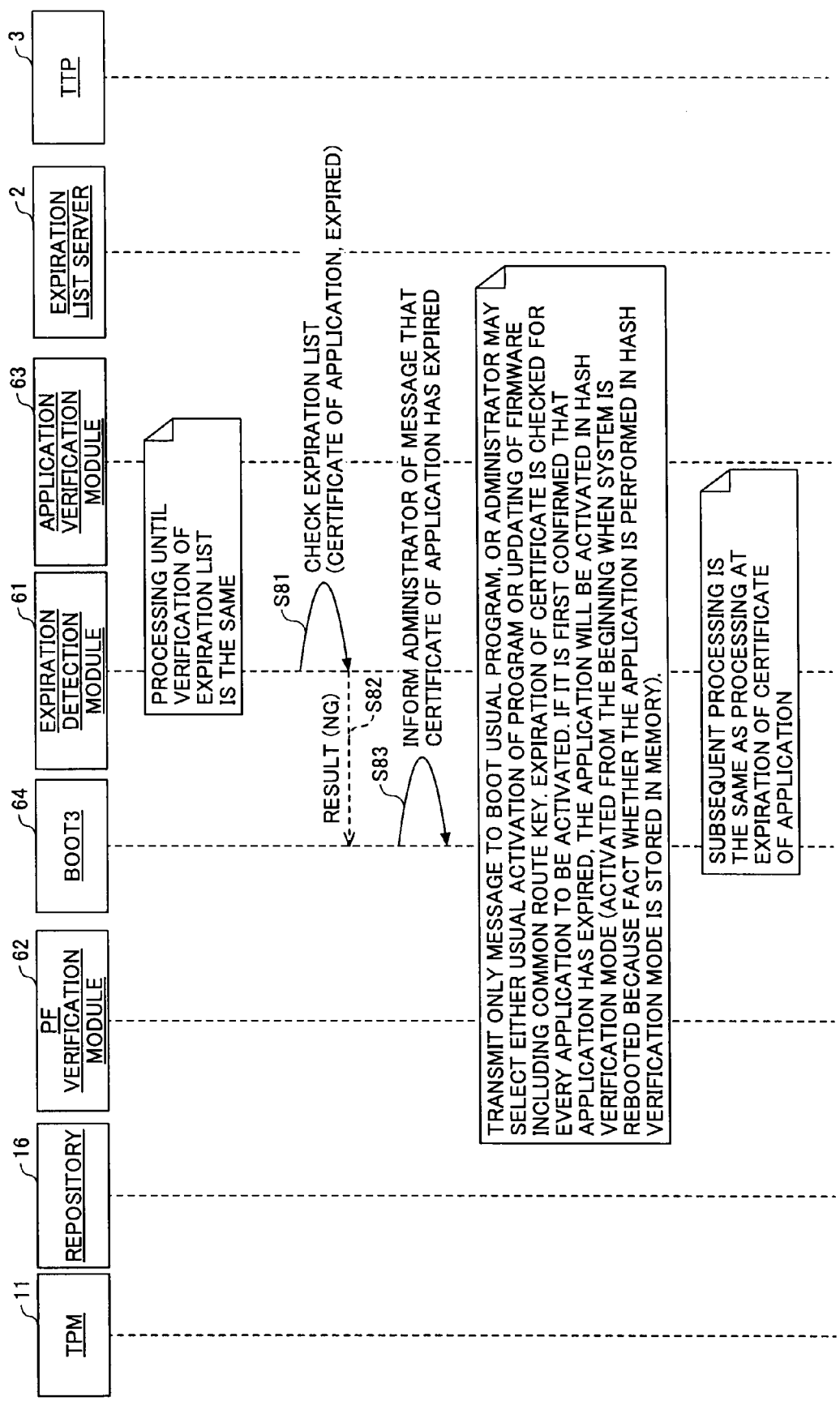
FIG. 13 is a sequence diagram of an example showing the operations of the MFP where the certificate of the signature key of the application has been registered on the expiration list.

As a result, where the certificate of the common route key has expired, the MFP 1 that performs the processing as shown in the sequence diagram of FIG. 11 can verify the validity of the applications 15 not with the digital signature of the respective applications 15 but with the hash values thereof. Furthermore, the MFP 1 can inform the administrator or the like of the fact that the common route key has been imperiled.

Where the certificates of the signature keys of the respective applications 15 have expired, the MFP 1 verifies the validity of the applications 15 as shown in FIG. 13 using the hash values or the list of the hash values obtained by the processing shown in the sequence diagram of FIG. 11.

FIG. 13 is a sequence diagram of an example showing the operations of the MFP where the certificate of the signature key of the application 15 is registered on the expiration list. Since the processing before step S81 is the same as the processing of steps S61 through S67 in FIG. 11, the diagrammatic representation and description of the processing are omitted.

The process proceeds to steps S81 where the expiration detection module 61 verifies whether the certificate of the signature key of the application 15 is registered on the expiration list. Here, it is assumed that the certificate of the signature key of the application 15 is registered on the expiration list. The process proceeds to step S82 where the expiration detection module 61 informs the boot3 64 of the result that the certificate of the signature key of the application 15 is registered on the expiration list. The process proceeds to step S83 where the boot3 64 informs the administrator or the like of a message that the certificate of the signature key of the application 15 has expired.

Note that the MFP 1 may inform the administrator or the like of the message to activate the respective applications 15. The MFP 1 may cause the administrator or the like to select either the activation of the respective applications 15 or the updating thereof. The expiration date of the certificate of the signature key in step S81 is confirmed for every application 15 to be activated.

If it is first confirmed that the certificate of the signature key has expired, the application 15 is activated in the hash verification mode. Since the fact whether the application 15 is activated in the hash verification mode is stored in a memory, the processing until step S83 is performed from the beginning when the MFP 1 is rebooted. Since the following processing is the same as the processing after step S35 in FIG. 8, the description of the processing is omitted.

As a result, where the certificate of the signature key of the application 15 has expired, the MFP 1 that performs the processing as shown in the sequence diagram of FIG. 13 can verify the validity of the applications 15 not with the digital signature of the respective applications but with the hash values thereof. Furthermore, the MFP 1 can inform the administrator or the like of the fact that the certificate of the signature key of the application 15 has expired.

The present invention is not limited to the specifically disclosed embodiments, and variations and modifications may be made without departing from the scope of the present invention.

The present application is based on Japanese Priority Application No. 2007-067252 filed on Mar. 15, 2007, the entire contents of which are hereby incorporated herein by reference.

What is claimed is:

1. An information processing apparatus that verifies validity of software to be operated, the apparatus comprising:
   a first non-transitory storage unit configured to store a certificate used for verifying the validity of the software stored in a storage device;
   an expiration detection unit configured to detect expiration of the certificate stored by the first storage unit;
   a software verification unit configured to verify the validity of the software using the certificate stored by the first storage unit;
   a second storage unit configured to store a value uniquely calculated from the software stored in the storage device, when the certificate has not expired and the software is valid; and
   a platform verification unit configured to verify validity of a boot operation by comparing a value stored in the first storage unit with a value stored in the second storage unit,
   wherein the software verification unit verifies the validity of the software using the value uniquely calculated from the software, when the certificate has expired or the software is invalid.

2. The information processing apparatus according to claim 1, wherein the expiration detection unit is configured to detect the expiration of the certificate by confirming an expiration date of the certificate.

3. The information processing apparatus according to claim 1, wherein the expiration detection unit is configured to detect the expiration of the certificate by confirming a list of expired certificates supplied from an external server via a network.

4. The information processing apparatus according to claim 2, wherein the expiration detection unit is configured to detect expiration of the software or a certificate of an encryption key used for verifying the validity of the software.

5. The information processing apparatus according to claim 1, wherein the software verification unit previously stores a hash value of the software in the second storage unit, when the certificate has not expired and the software is valid, and verifies the validity of the software using the hash value of the software, when the certificate has expired or the software is invalid.

6. The information processing apparatus according to claim 1, wherein the software verification unit previously stores a list of hash values of the software in the second storage unit, when the certificate has not expired and the software is valid, and verifies the validity of the software using the list of the hash values of the software, when the certificate has expired or the software is invalid.

7. The information processing apparatus according to claim 1, further comprising:
   a display that displays a message indicating that the certificate has expired or the software is invalid.

8. The information processing apparatus according to claim 1, wherein the first storage unit is realized by a TPM (Trusted Platform Module).

9. A software verification method implemented by a computer processor programmed as an information processing apparatus that verifies validity of software to be operated, the method comprising:
   storing in a first storage unit, a certificate used for verifying the validity of the software stored in a storage device;
   detecting expiration of the certificate stored by the first storage unit;
   storing, in a second storage unit, a value uniquely calculated from the software stored in the storage device, when the certificate has not expired and the software is valid;
   verifying, by the information processing apparatus, validity of a boot operation by comparing a value stored in the first storage unit with a value stored in the second storage unit; and
   verifying, by the information processing apparatus, the validity of the software using the value uniquely calculated from the software, when the certificate has expired or the software is invalid.

10. The software verification method according to claim 9, wherein the detecting step further comprises detecting expiration of the certificate by confirming an expiration date of the certificate.

11. The software verification method according to claim 9, wherein the detecting step further comprises detecting expiration of the certificate by confirming a list of expired certificates supplied from an external server via a network.

12. The software verification method according to claim 10, wherein the detecting step further comprises detecting expiration of the software or a certificate of an encryption key used for verifying the validity of the software.

13. The software verification method according to claim 9, wherein the step of storing the value comprises storing a hash value of the software in the second storage unit, when the certificate has not expired and the software is valid, and the verifying step comprises verifying the validity of the software using the hash value of the software, when the certificate has expired or the software is invalid.

14. The software verification method according to claim 9, wherein the step of storing the value comprises storing a list of hash values of the software when the certificate has not expired and the software is valid, and the verifying step comprises verifying the validity of the software using the list of the hash values of the software, when the certificate has expired or the software is invalid.

15. The software verification method according to claim 9, further comprising:
   displaying a message indicating that the certificate has expired or the software is invalid.

16. The software verification method according to claim 9, wherein the first storage unit is realized by a TPM (Trusted Platform Module).

17. A non-transitory computer-readable storage medium storing a software verification program which, when executed by an information processing apparatus that verifies validity of software to be operated, causes the information processing apparatus to perform the steps of:
    storing in a first storage unit, a certificate used for verifying the validity of the software stored in a storage device;
    detecting expiration of the certificate stored by the first storage unit;
    storing, in a second storage unit, a value uniquely calculated from the software stored in the storage device, when the certificate has not expired and the software is valid;
    verifying validity of a boot operation by comparing a value stored in the first storage unit with a value stored in the second storage unit; and
    verifying the validity of the software using the value uniquely calculated from the software, when the certificate has expired or the software is invalid.

* * * * *